(12) United States Patent
Tkachuk et al.

(10) Patent No.: US 8,347,320 B2
(45) Date of Patent: Jan. 1, 2013

(54) GENERATING A DRIVER FOR ANALYSIS OF AN EVENT-DRIVEN APPLICATION

(75) Inventors: Oksana Tkachuk, Palo Alto, CA (US); Sreeranga P. Rajan, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 303 days.

(21) Appl. No.: 12/751,982

(22) Filed: Mar. 31, 2010

(65) Prior Publication Data

US 2010/0293557 A1   Nov. 18, 2010

Related U.S. Application Data

(60) Provisional application No. 61/177,908, filed on May 13, 2009.

(51) Int. Cl.
*G06F 3/00* (2006.01)
(52) U.S. Cl. .................................................. 719/327
(58) Field of Classification Search .................. 719/318
See application file for complete search history.

(56) References Cited

U.S. PATENT DOCUMENTS

| | | | | |
|---|---|---|---|---|
| 7,600,014 B2 * | 10/2009 | Russell et al. | ................. | 709/224 |
| 2004/0205774 A1 * | 10/2004 | Goodwin et al. | ............. | 719/318 |
| 2008/0172258 A1 * | 7/2008 | Weger et al. | ....................... | 705/4 |
| 2012/0084609 A1 | 4/2012 | Tkachuk et al. | ................. | 714/48 |

OTHER PUBLICATIONS

Shashi Shekhar, Genesis and Advanced Traveler Information System(ATIS): Killer Applications for Moble Computing?, 1994.*

European Search Report for EP 10161423.8, Dec. 13, 2010.
Loh, A. et al., "Generating web applications from use case scenarios", *Software Engineering Conference*, Apr. 13, 2004.
Mesbah, A. et al., "A component- and push-based architectural style for ajax applications", *Journal of Systems & Software*, 81(12), Dec. 1, 2008.
Mesbah, A. et al., "Invariant-based automatic testing of AJAX user interfaces", *IEEE 31st International Conference on Software Engineering*, May 16, 2009.
Apache Struts—Key Technologies Primer, struts.apache.org/primer.html, downloaded Oct. 7, 2010.
About Apache Struts 2, struts.apache.org/2.2.1/index.html, downloaded Oct. 7, 2010.
Welcome to Struts 1, struts.apache.org/2.0.14/index.html, downloaded Oct. 7, 2010.
Barlas, E. et al., "NetStub, A framework for verification of distributed java applications," *ASE '07: Proceedings of the twenty-second IEEE/ACM international conference on Automated software engineering*, 2007.
Barrett, C. et al., "CVC Lite: A new implementation of the cooperating validity checker," *Proceedings of the 16th International Conference on Computer Aided Verification, CAV*, Jul. 2004.

(Continued)

*Primary Examiner* — Lechi Truong
(74) *Attorney, Agent, or Firm* — Baker Botts LLP

(57) ABSTRACT

In one embodiment, a method includes specifying an application-specific navigation model of an event-driven application; analyzing the navigation model with respect to one or more navigation requirements of the event-driven application to determine whether the event-driven application satisfies the navigation requirements; generating one or more drivers for the event-driven application based on the navigation model; and traversing the navigation model with the application-independent event drivers to analyze the event-driven application with respect to one or more business-logic requirements of the event-driven application to determine whether the event-driven application satisfies the business-logic requirements.

14 Claims, 7 Drawing Sheets

OTHER PUBLICATIONS

Brat, G. et al., "Java PathFinder—a second generation of a Java model-checker," *Proceedings of the Workshop on Advances in Verification*, Jul. 2000.
Clarke, E. M. et al., "Automatic Verification of Finite State Concurrent Systems using Temporal Logic Specifications," *ACM transactions on Programming Languages and Systems*, 8(2):244-263, Apr. 1986.
Deutsch, A. et al., "Verification of communicating data-driven web services," *PODS*, pp. 90-99, 2006.
Dwyer, M. et al., "Patterns in Property Specifications for Finite-State Verification," *Proceedings of the 21st International Conference on Software Engineering*, May 1999.
Welcome to Junit.org!, junit.org, downloaded Oct. 7, 2010.
JwebUnit—JwebUnit, jwebunit.sourceforge.net/articles.html, downloaded Oct. 7, 2010.
Thinking Inside a Biggar Box, "In-Process Web Integration Tests with Jetty and JwebUnit",johannesbrodwall.com/2006/12/10/in-process-web-integration-tests-with-jetty-and-jwebunit/, downloaded Oct. 7, 2010.
JSR 168 and JSR 286 Portlet Development Blog—News, Articles, Tutorial . . . , portletwork.blogspot.com/2007/08/testing-portlets-with-jetty-pluto-and.html, downloaded Oct. 7, 2010.
JwebUnit—Frequently Asked Questions, http://jwebunit.sourceforge.net/faq.html#javascript-support, downloaded Oct. 7, 2010.
JwebUnit—Building JwebUnit with Maven 2, jwebunit.sourceforge.net/building-maven.html, downloaded Oct. 7, 2010.
JwebUnit—How to Contribute to JwebUnit, jwebunit.sourceforge.net/how-to-contribute.html, downloaded Oct. 7, 2010.
How-To Release JwebUnit with Maven 2, jwebunit.sourceforge.net/how-to-release.html, downloaded Oct. 7, 2010.
JwebUnit—JwebUnit Welcome, jwebunit.sourceforge.net/index.html, downloaded Oct. 7, 2010.
A. Kubo, et al., "Automatic extraction and verification of page transitions in a web application," *APSEC '07: Proceedings of the 14th Asia-Pacific Software Engineering Conference*, 3, IEEE Computer Society, 2007.
Memom, A. et al., "GUI ripping: Reverse engineering of graphical user interfaces for testing," *WCRE '03: Proceedings of the 10th Working Conference on Reverse Engineering*, IEEE Computer Society, 2003.
Mesbah A. et al., "Invariant-based automatic testing of ajax user interfaces," *Proceedings of the 31st International Conference on Software Engineering (ISCE '09), Research Papers*. IEEE Computer Society, 2009.
Rajan, S. P. et al., "Weave: Web applications validation environment," *Proceeding B of the 31st International Conference on Software Engineering*, May 2009.
Rice, D. "*Geekonomics: The Real Cost of Insecure Software*" Book, 2007 ordered.
Selenium Documentation, seleniumhq.org/docs/, downloaded Oct. 7, 2010.
Introducing Selenium—Selenium Documentation, seleniumhq.org/docs/01_introducing_selenium.html, downloaded Oct. 7, 2010.
Selenium Basics—Selenium Documentation, http://seleniumhq.org/docs/02_selenium_basics.html, downloaded Oct. 7, 2010.
Selenium-IDE—Selenium Documentation, seleniumhq.org/docs/03_selenium_ide.html, downloaded Oct. 7, 2010.
Selenium Commands—Selenium Documentation, seleniumhq.org/docs/04_selenese_commands.html, downloaded Oct. 7, 2010.
Selenium-RC, seleniumhq.org/docs/05_selenium_rc.html, downloaded Oct. 7, 2010.
Test Design ConsIDerations—Selenium Decumentation, selenium.org/docs/06_test_design_considerations.html, downloaded Oct. 7, 2010.
Selenium Grid—How it Works, selenium-grid.seleniumhq.org/how_it_works.html, downloaded Oct. 7, 2010.
User-Extensions—Selenium Documentation, seleniumhq.org/docs/08_user_extensions.html, downloaded Oct. 7, 2010.
Selenium 2.0 and Web Driver—Selenium Documentation, seleniumhq.org/docs/09_webdriver.html, downloaded Oct. 7, 2010.
.Net client driver configuration—Selenium Documentation, seleniumhq.org/docs/appendix_installing_dotnet_driver_client.html, downloaded Oct. 7, 2010.
Java Client Driver Configuration—Selenium Documentation, seleniumhq.org/docs/appendix_installing_java_driver_client.html, downloaded Oct. 7, 2010.
Python Client Driver Configuration—Selenium Documentation, seleniumhq.org/docs/appendix_installing_python_driver_client.html, downloaded Oct. 7, 2010.
Locating Techniques—Selenium Documentation, seleniumhq.org/docs/appendix_locating_techniques.html, downloaded Oct. 7, 2010.
How Selenium Works, seleniumhq.org/about/how.html, downloaded Oct. 7, 2010.
Selenium IDE Plugins, seleniumhq.org/projects/ide/, downloaded Oct. 7, 2010.
Selenium Remote-Control, seleniumhq.org/projects/remote-control/, downloaded Oct. 7, 2010.
Selenium Grid, selenium-grid.seleniumhq.org/, downloaded, Oct. 7, 2010.
Selic, B. "Tutorial: An overview of uml 2.0," *ICSE '04: Proceedings of the 26th International Conference on Software Engineering*, pp. 741-742, IEEE Computer Society, 2004.
J2EE v1.4 Downloads, www.oracle.com/technetwork/java/javaee/download-141771.html, downloaded Oct. 7, 2010.
Sprenkle, S. et al., "Automated replay and failure detection for web applications," *ASE '05: Proceedings of the 20th IEEE/ACM international Conference on Automated software engineering*, 2005.
Cloud Application Platform for Spring—Java SpringSource, www.springsource.com/, downloaded Oct. 7, 2010.
VMware vFabric Cloud Application Platform SpringSource, www.springsource.com/products/cloud-application-platform, downloaded Oct. 7, 2010.
Unmatched Performance Management for Virtualized Java Apps SpringSource, www.springsource.com/hyperic44, downloaded Oct. 7, 2010.
Using Spring Insight, static.springsource.com/projects/te-server/2.0/devedition/htmlsingle/devedition.html, downloaded Oct. 7, 2010.
Steven, J. et al., jrapture: A capture/replay tool for observation-based testing *SIGSOFT Software Eng. Notes*, 25(5):158-167, 2000.
Stoller, S.D. et al., "Transformations for model checking distributed java programs," *Proc. 8th Int'l. SPIN Workshop on Model Checking of Software*, vol. 2057 of Lecture Notes in Computer Science, May 2001.
Sun. JavaServer Pages. java.sun.com/products/jsp/index.jsp, downloaded Oct. 7, 2010.
JavaServer Pages Technology—Frequently Asked Questions, java.sun.com/products/jsp/faq.html, downloaded Oct. 7, 2010.
JavaServer Pages [tm] Technology—White Paper, java.sun.com/products/jsp/whitepaper.html, downloaded Oct. 7, 2010.
JavaServer Pages [tm] Technology—JavaServer Pages Servlet Developer White Paper, java.sun.com/products/jsp/jsp-developerwp.html, downloaded Oct. 7, 2010.
JavaServer Pages[tm] Technology—JavaServer Pages White Papers, java.sun.com/products/jsp/jspguide-wp.html, downloaded Oct. 7, 2010.
JavaServer Pages[tm] Technology—JavaServer Pages Comparing Methods for Server-Side Dynamic Content White Papers, java.sun.com/products/jsp/jspservlet.html, downloaded Oct. 7, 2010.
JavaServer Pages[tm] (JSP[tm]) Syntax Version 2.0, java.sun.com/products/jsp/syntax/2.0/card20.pdf, downloaded Oct. 7, 2010.
JavaServer Pages[tm] (JSP[tm]) Syntax Version 1.2, java.sun.com/products/jsp/syntax/1.2/card12.pdf, downloaded Oct. 7, 2010.
Tkachuk, O., "Bandera Environment Generator Website," beg.projects.cis.ksu.edu, downloaded Oct. 7, 2010.
Using BEG, Bandera Environment Generator, beg.projects.cis.ksu.edu/using.html, downloaded Oct. 7, 2010.
About BEG, Bandera Environment Generator, beg.projects.cis.ksu.edu/papers/ase04.pdf dwyer analyzing article, downloaded Oct. 7, 2010.
About Bandera, bandera.projects.cis.ksu.edu/, downloaded Oct. 7, 2010.

Bogor Website, About Bogor, bogor.projects.cis.ksu.edu/, downloaded Oct. 7, 2010.

Anand, S. et al., "JPF-SE: A Symbolic Execution Extension to Java PathFinder", College of Computing, Georgia Institute of Technology, Moffett Field, CA, 2007.

Tkachuk, Oksana, "Adapting Side Effects Analysis for Modular Program Model Checking," *ESEC/FSE'03, ACM*, 2003.

Tkachuk, O. et al., "Application of automated environment generation to commercial software," *ISSTA '06: Proceedings of the 2006 international symposium on Software testing and analysis*, pp. 203-214, 2006.

Tkachuk, O. et al., "Automated environment generation for software model checking," *Proceedings of the 18th IEEE International Conference on Automated Software Engineering*, Oct. 2003.

Tkachuk, O. et al, "Environment generation for validating event-driven software using model checking, "*IET Softw.*, vol. 4, Iss. 3, 2010.

Yu, F. et al., "Modular verification of web services using efficient symbolic encoding and summarization," *SIGSOFT '08/FSE•16: Proceedings of the 16th ACM SIGSOFT International Symposium an Foundations of software engineering*, pp. 192-202, 2008.

Beck, Kent et al., JUnit Cookbook, file://E:\cookbook.htm, downloaded Oct. 7, 2010.

Mesbah, A. et al., "A Component-and Push-Based Architectural Style for AJAX Applications", The Journal of Systems and Software, Delft University of Technology, Software Engineering Research Group, Mekeiweg, The Netherlands, 2008.

Dwyer, Matthew B. et al., "Analyzing Interaction Orderings with Model Checking", ASE '04, Proceedings of the 19th IEEE International Conference on Automated Software Engineering, IEEE Computer Society, Washington, DC, USA, 2004.

JUnit 4.6, Sunnary of Changes in Version 4.6, file://E:\README.html, downloaded Oct. 7, 2010.

Junit 4 In 60 Seconds at Cavdar.net, www.cavdar.net/2008/07/21/junit-4-in-60-seconds/, downloaded Oct. 6, 2010.

JUnit: A Cook's Tour, file://E:\cookstour.htm, downloaded Oct. 7, 2010.

JUnit FAQ, file://E:\faq.htm, downloaded Oct. 7, 2010.

JUnit, file ://E:\hompage.html, downloaded Oct. 7, 2010.

JUnit Test Infected: Programmers Love Writing Tests, file://E:\testing,htm, downloaded Oct. 7, 2010.

JwebUnit—Articles, jwebunit.sourceforge.net/articles.html, downloaded Oct. 7, 2010.

Loh, Dr. Allan et al., "Generating Web Applications from Use Case Scenarios", Proceedings of the 2004 Australian Software Engineering Conference (ASWEC'04), Department of Computing, Curtin University of Technology, Perth, Australia, 2004.

Summary of Changes in Version 4.5, file://E:\ReleaseNotes4.4.html, downloaded Oct. 7, 2010.

Summary of Changes in Version 4.7, file://E:\ReleaseNotes4.7.html, downloaded Oct. 7, 2010.

Summary of Changes in Version 4.8.1, file://E:\ReleaseNotes4.8.1html, downloaded Oct. 7, 2010.

Summary of Changes in Version 4.8.2, file://E:\ReleaseNotes4.8.2.html, downloaded Oct. 7, 2010.

Summary of Changes in Version 4.9, file://E:\ReleaseNotes4.9.html, downloaded Oct. 7, 2010.

Summary of Changes in Version 4.8, file://E:ReleaseNotes4.8.html, downloaded Oct. 7, 2010.

Yuen, S. et al., "Web automata: A behavioral model of web applications based on the mvc model," *Information and Media Technologies*, 1(1):66-79, 2006.

* cited by examiner

*Input: ptg*
```
proc main()
    Page init = ptg.getInitPage()
    processPage(init)

proc processPage(Page p)
    for each Event e ∈ p.getEvents()
        if e.isEnabled() processEvent(e)

proc processEvent(Event e)
    for each EventData ed ∈ e.getEventData()
        HttpServletRequest req = new HttpServletRequest()
        processEventData(req, ed)
        processEventHandling(e, req)

proc processEventData(HttpServletRequest req, EventData d)
    for each EventItem ei ∈ d.getEventItems()
        populateEvent(req,ei)

proc processEventHandling(Event e, HttpServletRequest req)
    for each EventHandler h ∈ e.getEventHandlers()
        HttpServletResponse res = h.perform(req)
        Page nextPage = e.nextPage(res)
        processPage(nextPage)
```

*FIG. 3*

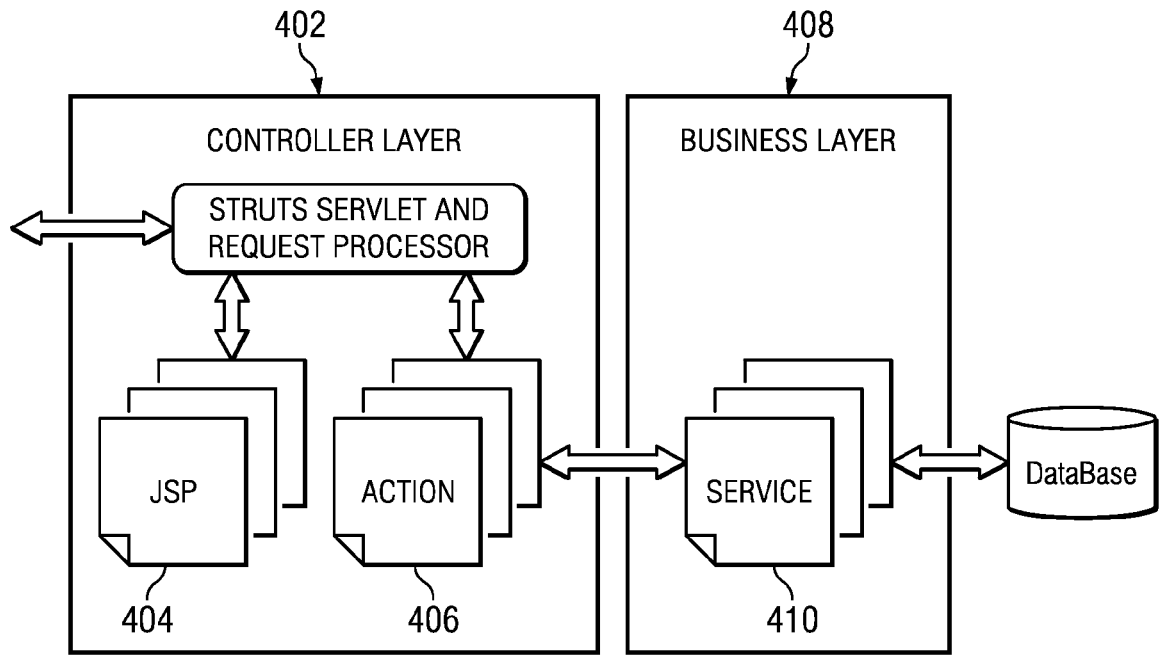

FIG. 4

```
//from welcome.jsp
<html:link page="/Welcome.do">
    <font color="white">Home</font> </html:link>

<html:link page="/pages/user/userRegister.jsp">
    <font color="white">Register</font> </html:link>
<html:link page="/pages/user/userlogin.jsp">
    <font color="white">Login</font> </html:link>

//from userlogin.jsp
<html:form action="/userlogin" method="post">
```

FIG. 5

```
<action mappings>
...
<action
    path="/userlogin"
    name="UserLoginForm"
    scope="request"
    validate="true"
    input="userlogin.jsp"
    type="roseindia.web.struts.action.UserLoginAction">
  <forward name="success" path="loginsuccess.jsp" />
  <forward name="failure" path="userlogin.jsp" />
</action>
</action-mappings>
```

```
public Screen processEventHandling (
    Event event, HttpServletRequest req) {
    List handlers = event.getEventHandlers ( ) ;
    for (Iterator it=handlers.iterator ( ) ; . . . ; )
    {
        action = (Action) it.next ( ) ;
        forward = action.execute ( . . ., form, req, res) ;
        nextPage = getNextPage (event, forward) ;
        . . .
    }
}
public void processEventData (EventData eventData,
    HttpServletRequest req) (
    form = eventData.getForm ( ) ;
    . . .
}
}
```

FIG. 8

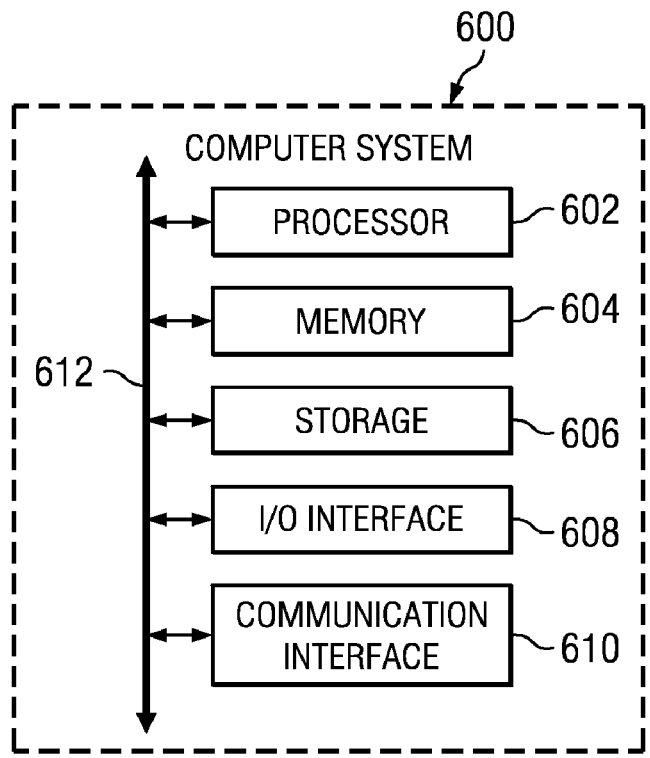

FIG. 11

Path 1: [[screen: index.jsp: event: /Welcome], [screen: Welcome.jsp: event: /Welcome], [screen: Welcome.jsp: event: userRegister.jsp]]

Path 2: [[screen: index.jsp: event: /Welcome], [screen: Welcome.jsp: event: /Welcome], [screen: Welcome.jsp: event: userlogin.jsp]]

Path 3: [[screen: index.jsp: event: /Welcome], [screen: Welcome.jsp: event: /Welcome], [screen: Welcome.jsp: event: userRegister.jsp], [screen: userRegister.jsp: event: /userregister, result: success]]

Path 4: [[screen: index.jsp: event: /Welcome], [screen: Welcome.jsp: event: /Welcome], [screen: Welcome.jsp: event: userRegister.jsp], [screen: userRegister.jsp: event: /userregister, result: input]]

Path 5: [[screen: index.jsp: event: /Welcome], [screen: Welcome.jsp: event: /Welcome], [screen: Welcome.jsp: event: userRegister.jsp], [screen: userRegister.jsp: event: /Welcome]]

Path 6: [[screen: index.jsp: event: /Welcome], [screen: Welcome.jsp: event: /Welcome], [screen: Welcome.jsp: event: userlogin.jsp], [screen: userlogin.jsp: event: /userlogin, result: success]]

Path 7: [[screen: index.jsp: event: /Welcome], [screen: Welcome.jsp: event: /Welcome], [screen: Welcome.jsp: event: userlogin.jsp], [screen: userlogin.jsp:' event: /userlogin, result: failure]]

Path 8: [[screen: index.jsp: event: /Welcome], [screen: Welcome.jsp: event: /Welcome], [screen: Welcome.jsp: event: userlogin.jsp], [screen: userlogin.jsp: event: /Welcome]]

*FIG. 10*

GENERATING A DRIVER FOR ANALYSIS OF AN EVENT-DRIVEN APPLICATION

RELATED APPLICATION

This application claims the benefit, under 35 U.S.C. §119(e), of U.S. Provisional Patent Application No. 61/177,908, filed 13 May 2009, which is incorporated herein by reference.

TECHNICAL FIELD

This disclosure relates generally to event-driven applications, such as, for example, graphical user interface (GUI) or web applications.

BACKGROUND

Quality assurance for event-driven applications—particularly applications with graphical user interfaces (GUIs) or ones designed for use in connection with the World Wide Web—is increasingly important. Event-driven applications are often difficult to test because they have large sets of possible user inputs. Current approaches to testing event-driven applications include live-subject testing, capture-replay, unit testing, crawling, and model-based testing. Live-subject testing and capture-replay approaches involve considerable manual work and require a tester to step through a set of use-case scenarios while clicking on buttons or links and entering data into forms displayed through an interface, such as a web browser supporting the event-driven application. While event-driven applications are often designed to constrain and guide a user through a set of scenarios, the set of all possible user inputs may be too large for manual testing. Unit test cases are generally designed to check one user event at a time and do not adequately address the checking of sequences of user events. Crawling techniques are typically designed to visit web pages automatically. However, without user guidance (e.g., the specification of user inputs), crawlers may be unable to visit all possible pages of an event-driven application. Model-based approaches generally rely on user specifications.

BRIEF DESCRIPTION OF THE DRAWINGS

FIG. 3 illustrates an example PTG-based driver traversal algorithm.

FIG. 4 illustrates an example data flow for an example event-driven application.

FIG. 5 illustrates an example code excerpt from an example JAVA SERVERPAGES (JSP) file.

FIG. 8 illustrates example driver extensions for example STRUTS-specific event-handling application programming interfaces (APIs).

FIG. 10 illustrates example output of an example PTG traversal.

FIG. 11 illustrates an example computer system.

DESCRIPTION OF EXAMPLE EMBODIMENTS

Figure 1:
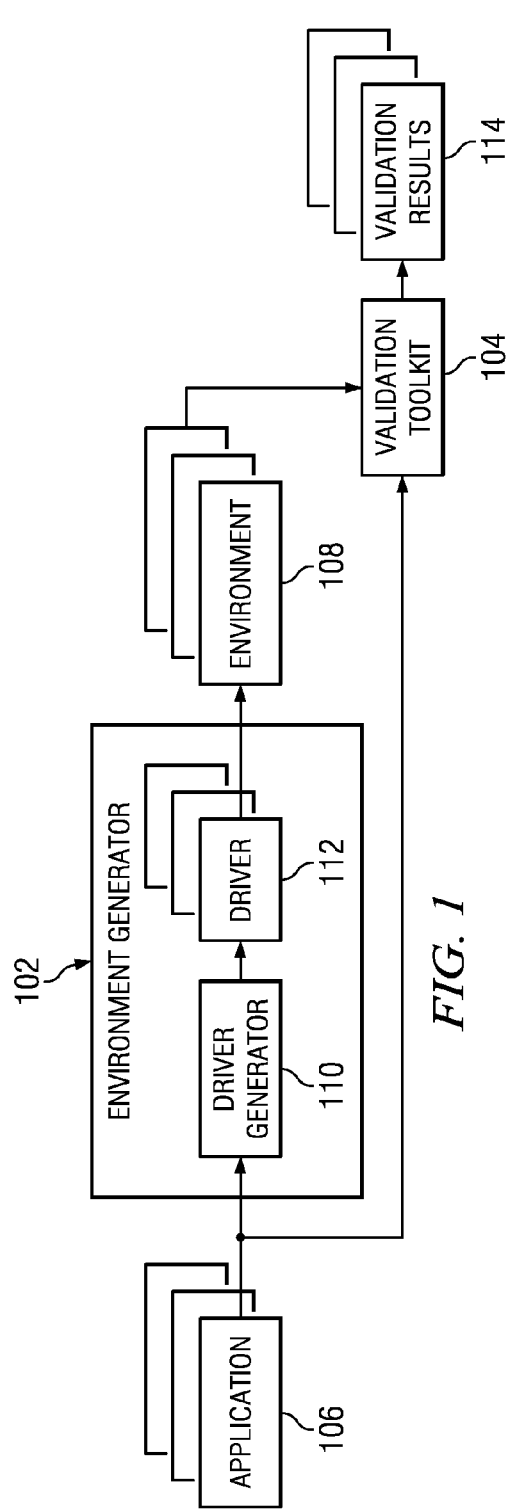
FIG. 1 illustrates an example framework for validating an event-driven application.

In particular embodiments, to analyze an event-driven application, it may be necessary to create (1) a driver to exercise the behavior of the event-driven application and (2) stubs to simulate components that the event-driven application may use but are out of the scope of the analysis. For example, a driver may simulate user actions with respect to the event-driven application and stubs may simulate a database used by the event-driven application. Particular embodiments may generate a driver for an event-driven application by employing a technique that involves (1) specifying an application-specific PTG that encodes information about the possible pages of the web application, user events (e.g., the selection of links or buttons on those pages), event handlers, and user data; and (2) using an application-independent driver to traverse the application-specific PTG and generate sequences of user events allowed by the application-specific PTG. This technique may facilitate the checking of navigation and business-logic requirements of a web application.

Particular embodiments relate to validating web or other event-driven applications that have been developed using JAVA or other suitable software platforms and that may utilize server-side technologies (e.g., JSP) or other technologies to generate web or other pages that include Hyper Text Markup Language (HTML) content, XML content, or other embedded resources for rendering and displaying to a user at a client or other device. Particular embodiments provide a framework that facilitates the validation of navigation and business-logic requirements of event-driven applications using model-based analysis techniques. Particular embodiments relate to a validation framework that performs validation based on a behavioral diagram, graph, or other model of the event-driven application under test. In particular embodiments, the behavioral model takes the form of a PTG model or data structure that encodes multiple nodes (e.g., screens or other pages), user events or transitions supported by the event-driven application (e.g., button clicks or clicks on links), corresponding event-handlers, and user data. Particular embodiments use the PTG to generate drivers and use-case scenarios including test sequences of one or more events that cover contemplated user-interaction patterns allowed by the interface of the event-driven application.

GUI and Web applications are generally open event-driven systems that take sequences of events (e.g., button clicks in a browser window or a GUI page or screen) and produce changes in the user interface displayed to a user (e.g., a transition to a different page or screen) or the underlying application (e.g., an online shopping cart at an online store becoming empty). To analyze an open event-driven application with validation techniques, it may be necessary to close the event-driven application with a model of the event-driven application's environment, represented by components that the event-driven application interacts with. Generally, the environment of an event-driven application under test may be grouped into drivers, which use the application under test (as a user interacting with the event-driven application may), and stubs(e.g., a database component or library code), which the event-driven application may call.

In particular embodiments, to generate a driver simulating user events, the types of events and event handlers used by the event-driven application must be identified. As an example and not by way of limitation, the event-handling mechanism of JAVA EE (JAVA PLATFORM, ENTERPRISE EDITION, also known as J2EE) applications is an example of the observer pattern, where application-specific event handlers register to listen for specific events. JAVA EE is a widely used platform for server programming in the JAVA programming language. The JAVA EE platform differs from the JAVA Standard Edition Platform (JAVA SE) in that it adds libraries which provide functionality to deploy fault-tolerant, distributed, multi-tier JAVA software, based largely on modular components running on an application server. A typical JAVA EE uses HttpServletRequest and HttpServletResponse types, from the javax.servlet.http package, to encode incoming and outgoing events. The event-handling classes usually have special event-handling method (e.g., perform(HttpServletRequest)). Registration of event handlers to events generally happens at the time of deployment of the application according to descriptor files such as, for example, XML configuration files.

FIG. 1 illustrates an example framework for validating an event-driven application. The framework includes environment generator 102 and validation toolkit 104. Environment generator 102 accesses an implementation of the application under test 106. As an example and not by way of limitation, application 106 may be a web application or other event-driven application. In particular embodiments, environment generator 102 generates an implementation of an environment 108 of application 106. Environment 108 is generally represented by components that application 106 interacts with during execution of application 106. Application 106 and environment 108 may be input to validation toolkit 104 for analysis. Validation toolkit 104 may output one or more validation results 114. Environment generator 102 and validation toolkit 104 may be executed within or operate within one or more computer systems, as illustrated in FIG. 11 and described below. In particular embodiments, application code 106 resides at the same computer system as environment generator 102 or validation toolkit 104. As an alternative, application 106 may reside at a separate computer system that is connected or coupled to the computer system hosting environment generator 102 and validation toolkit 104. Environment generator 102 and validation toolkit 104 may include one or more software components residing at one or more computer systems, which may be similar to example computer system 600. Particular embodiments may implement either or both of environment generator 102 and validation toolkit 104 as hardware, software, or a combination of hardware and software. As an example and not by way of limitation, one or more computer systems may execute particular logic or software to perform one or more steps of one or more processes described or illustrated with respect to environment generator 102 and validation toolkit 104. One or more of the computer systems may be unitary or distributed, spanning multiple computer systems or multiple datacenters, where appropriate. The present disclosure contemplates any suitable computer system.

In particular embodiments, environment generator 102 includes a driver generator 110 that produces one or more drivers 112 that simulate user actions or events at a "front end" of application 106. Environment generator 102 may then combine drivers 112 output by driver generator 110 with stubs to generate environment 108. As an example and not by way of limitation, some user actions may produce or result in page transitions only while other user actions may generate events that are subsequently sent to corresponding event handlers for processing, for example, to trigger code execution of application 106. To generate a driver for application 106, driver generator 110 may identify the types of events and event handlers or event handling classes utilized by application 106.

In particular embodiments, driver generator 110 generates test sequences based on the behavior model that includes a PTG data structure (or PTG). In particular embodiments, driver generator 110 is configured to use the PTG that encodes information about possible pages or nodes of application 106 and possible events or transitions supported by application 106, along with information about the event handlers and event data for those events that require corresponding event handlers and event data. The PTG facilitates the registration of the event handlers for application 106 and generation of sequences of events to drive the event-handling code of application 106 and exercise possible sequence of events allowed by the PTG.

Figure 2:
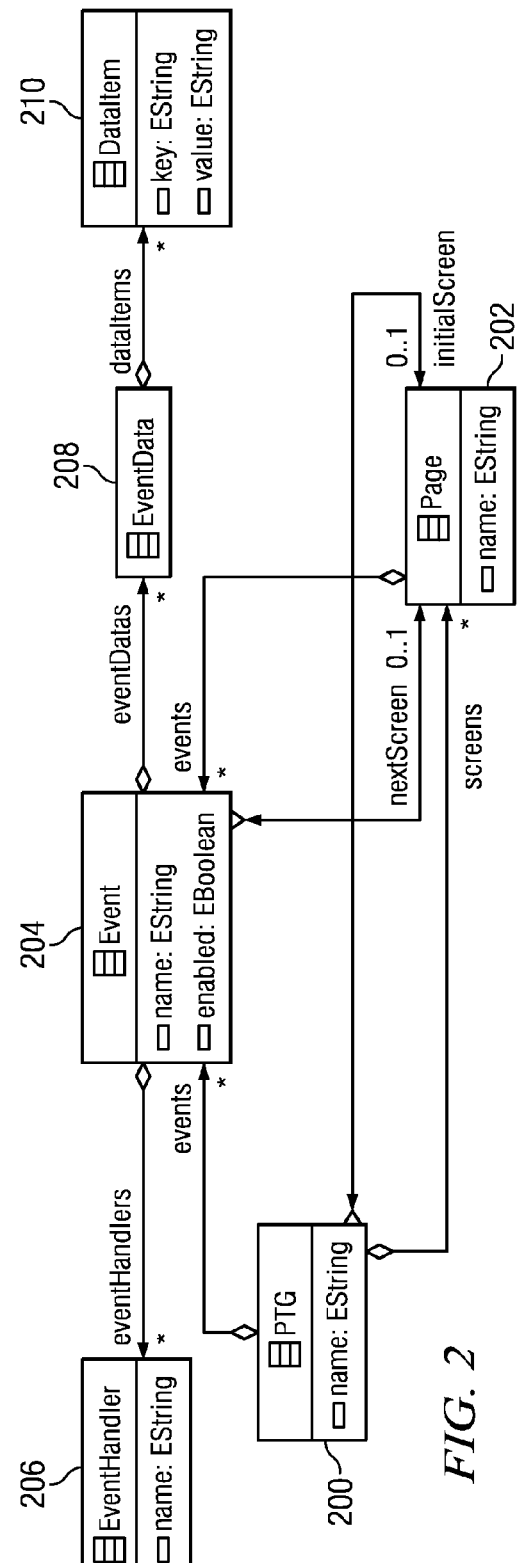
FIG. 2 illustrates an example unified modeling language (UML) class diagram of elements of a page transition graph (PTG) data structure.

FIG. 2 illustrates an example UML class diagram of elements of a PTG data structure 200 used by the driver generator 110. As an example and not by way of limitation, PTG 200 encodes application-specific information about the set of available pages 202 of application 106. Generally, each page 202 of PTG 200 representing application 106 includes a set of possible events 204. Each event 204 represents a user event (e.g., a button click or click on a link) that a user may perform when interacting with a particular page of application 106. Some events may not be always enabled (e.g., buttons and links may become disabled depending on some condition). To reflect this possibility, event 204 keeps track of its "enabledness," for example, using a boolean "enabled." Button clicks, among other user events, are typically handled by corresponding event handlers. As such, some events 204 may have a set of event handlers 206 associated with them. Additionally, some events may require user data, such as in when a page presents a form or text box with which a user may enter information. To reflect this possibility, an event 204 may have a set of event data 208, populated with data items 210, attached to it. As an example and not by way of limitation, event data 208 may hold keys and values that may correspond to the names of the text fields (e.g., userID and password of a login form) and the user values entered in such fields. Generally, the PTG data structure used by driver generator 110 serves as a specification of the event handler registrations and possible use-case scenarios for validating application 106. Driver generator 110 generates one or more drivers 112 based on the PTG data structure that may then be used to set up the event-handling core of application 106 and exercise possible sequences of events allowed by the PTG.

In particular embodiments, the PTG data structure is modeled using ECLIPSE MODELING FRAMEWORK (EMF). EMF supports model specification using JAVA interfaces. As an example and not by way of limitation, given JAVA interfaces, EMF may automatically generate the PTG code and provide additional facilities, such as writing the model in XML and loading it from XML to JAVA.

In particular embodiments, the PTG may offer two levels of information: (1) navigation and (2) navigation with event-handling. The navigation level, containing information about possible page transitions, may be used to perform checking with respect to navigation requirements of application 106. In particular embodiments, as this analysis (performing validation with respect to navigation requirements of application 106) does not require that application 106 be a part of the model, this analysis may be implemented using any suitable graph-checking algorithms. As an example and not by way of limitation, a set of requirement templates used to check navigation requirements of application 106 may include reachability (e.g, page A is reachable from page B), shortest path (e.g., page A is at least N steps away from page B), and precedence (e.g., to visit page A, a user must first go through page B).

Each requirement template may be instantiated with specific page values A and B. To increase usability, particular embodiments offer possible values for A and B, based on the application-specific PTG used by environment generator 102. However, this step may still require selecting specific page names from a list of pages available from or supported by application 106. Furthermore, particular embodiments include several checks that look for possible violations without user specifications. As an example and not by way of limitation, particular embodiments may include checks for possible violations in application 106 such as presence of unreachable pages. As another example, a customizable application-specific checker may check whether every page available from application 106 has a link back to the home page of the application.

In contrast to navigation requirements, to check business logic requirements, the underlying code of application 106 must be checked. In particular embodiments, driver generator 110 incorporates an application-independent driver 112 based on the PTG data structure that, given a populated application-specific PTG data structure, traverses the PTG and generates and executes sequences of user events. As described above, the driver 112 may be reused for applications associated with the same framework for which the driver was produced.

FIG. 3 illustrates an example PTG-based traversal algorithm, which may be used to implement a driver incorporated into driver generator 110. This traversal is specifically designed for JAVA EE event-handling APIs. As an example and not by way of limitation, the driver may implement the following: processPage( )calls processEvent( )for each enabled event attached to the given page; processEvent( )creates an HttpServletRequest object, populates the HttpServletRequest object, and executes the event-handling code; processEventData( )populates the HttpServletRequest object with event data; processEventHandling( )calls the event handling method of the event handler and returns a next page depending on the result. The algorithm implementing the driver of FIG. 3 recursively calls processPage( )on the next page. The algorithm may also be augmented with conditions to vary the traversal of the PTG. As an example and not by way of limitation, such conditions may include a condition that a list of visited transitions can be used to avoid loops and a condition that an integer constant can be used to limit the length of each generated sequence. Another feature of driver 112, in particular embodiments, is its extensible APIs. As an example and not by way of limitation, certain methods may be overridden to customize the driver according to a desired traversal algorithm, the underlying analysis framework (e.g., to execute with JAVA PATHFINDER (JPF) by changing for-loops into nondeterministic choices), and the framework used to encode the event-handling APIs (e.g., STRUTS). To encode a nondeterministic choice, one can use JPF's modeling primitive Verify.random(n) which forces JPF to systematically explore all possible values from a set of integers from 0 to n.

The implementation of driver 112 and stubs (collectively forming environment 108) along with the implementation of application 106 may be fed into validation toolkit 104. In particular embodiments, validation toolkit 104 employs the JPF model checker to check the business logic requirements of application 106. In particular embodiments, validation toolkit 104 also utilizes one or more JPF extensions to enable analysis of event-driven applications. Particular embodiments utilize the JPF listener framework to implement listeners that support requirement specification based on temporal logic.

In particular embodiments, driver generator 110 may include a driver 112 suitable for validating a STRUTS-based web applications. As an example and not by way of limitation, such Struts-based Web applications may encode their page transitions using XML, HTML, and JSP. In particular embodiments, the application PTG may be specified in XML. In particular embodiments, driver generator 110 may include one or more extensions for generating drivers for STRUTS-based applications. More specifically, particular embodiments include extensions of the PTG data structure and driver 112 for use with STRUTS-based web applications.

In STRUTS, the controller is represented by the STRUTS servlet controller, which intercepts incoming user requests and sends these requests to appropriate event handlers according to action mappings specified in, for example, an XML descriptor file called struts-config.xml. In Struts, the request-handling classes are subclassed from org.apache.struts.action.Action and the event-handling method is called execute( ). Actions encapsulate calls to business logic classes, interpret the outcome, and dispatch control to the appropriate view component to generate the response. Form population is supported by the ActionForm class, which facilitates the storing and validating of user data.

FIG. 4 illustrates an example data flow for an example event-driven application, which may be a STRUTS-based web application. The data flow generally alternates between: (1) view to action (e.g., when a user clicks on a link or submits a form 404 (which may be represented by JSP), controller layer 402 receives the request, looks up the mapping, and forwards to an appropriate action 406, which calls business layer 408); and (2) action to view, (e.g., after the call to underlying service 410 returns, action 406 forwards to a resource in the view layer and a page is displayed in a web browser.

In particular embodiments, PTG can be specified based on existing navigation models (e.g., in UML) or application implementation, using three sources: (1) information from JSP files; (2) information from XML configuration files; and (3) information from class (e.g., JAVA class) files that encode Actions and Forms of the application under test.

To demonstrate the technique of specifying the PTG, consider a registration example. The registration example allows users to register and login to their accounts, followed by a logout. This example has six JSP pages: index.jsp (the initial page), welcome.jsp, userlogin.jsp, loginsuccess.jsp, userRegister.jsp, and registerSuccess.jsp. Each JSP page corresponds to a node in the PTG, therefore, the PTG for this example contains at least six nodes. Each page contains information about possible user events. FIG. 5 illustrates an example code excerpt from an example JSP file relevant to population of the PTG for the registration example. The welcome page (welcome.jsp) contains links back to itself, to userRegister.jsp, and userlogin.jsp, and the userlogin.jsp page contains a reference to a "/userlogin" action. To resolve the meaning of this action, particular embodiments may need to consult one or more XML configuration files.

Figures 6, 7:
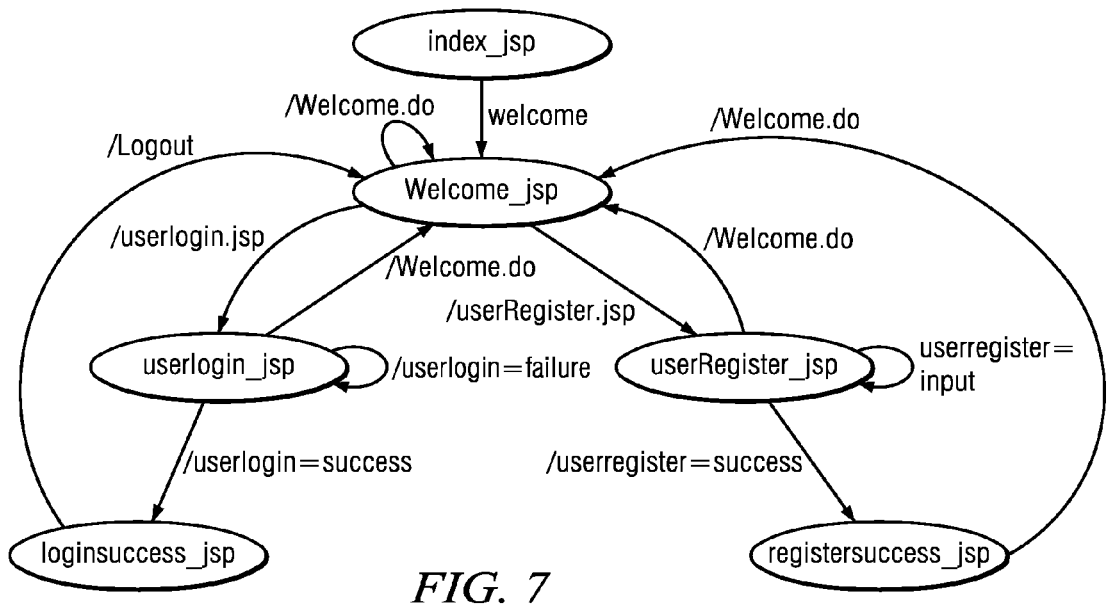
FIG. 6 illustrates an example code excerpt from an example struts-config.xml file.
FIG. 7 illustrates an example page-transition portion of an example PTG data structure.

STRUTS XML configuration files may contain mappings from user actions to their source page, the Action class that processes them, the Form class that holds user data, and possible destination pages. FIG. 6 illustrates an example code excerpt from an example struts-config.xml file that provides an action mapping for the UserLoginAction. In FIG. 6, UserLoginAction specifies the event handler type, UserLoginForm specifies the event is responds to, and userlogin.jsp specifies the page this event is available on. The outcome of the event depends on whether the event handling code returns, for example, "success" or "failure." In the case of success, the next page is loginsuccess.jsp, while, in the case of failure, the next page is userlogin.jsp.

FIG. 7 illustrates an example page-transition portion of an example PTG data structure for the registration example based on information in the application's JSP and XML files. In particular embodiments, the resulting PTG may be further enhanced with additional browser-supported transitions (e.g., clicking a "back" button in a Web browser rendering a page of application 106). However, it may be sufficient to specify the application-specific PTG for checking application-specific requirements and, as such, in particular embodiments, the generated PTG does not include various non-application-specific additional browser-supported transitions.

The PTG analysis of the application with respect to navigation requirements requires no extensions for STRUTS-based web applications. In particular embodiments, the PTG-based analysis of the application may require overriding the event-handling methods of the driver to confirm to STRUTS event-handling APIs. FIG. 8 illustrates example driver extensions for example STRUTS-specific event-handling APIs. The extensions are code excerpts from a driver 112 produced for STRUTS-based web applications needed to override event-handling methods, to account for the STRUTS-specific event-handling APIs. In particular embodiments, the driver generation and its extensions for STRUTS-based web applications may be implemented using JAVA.

Figure 9:
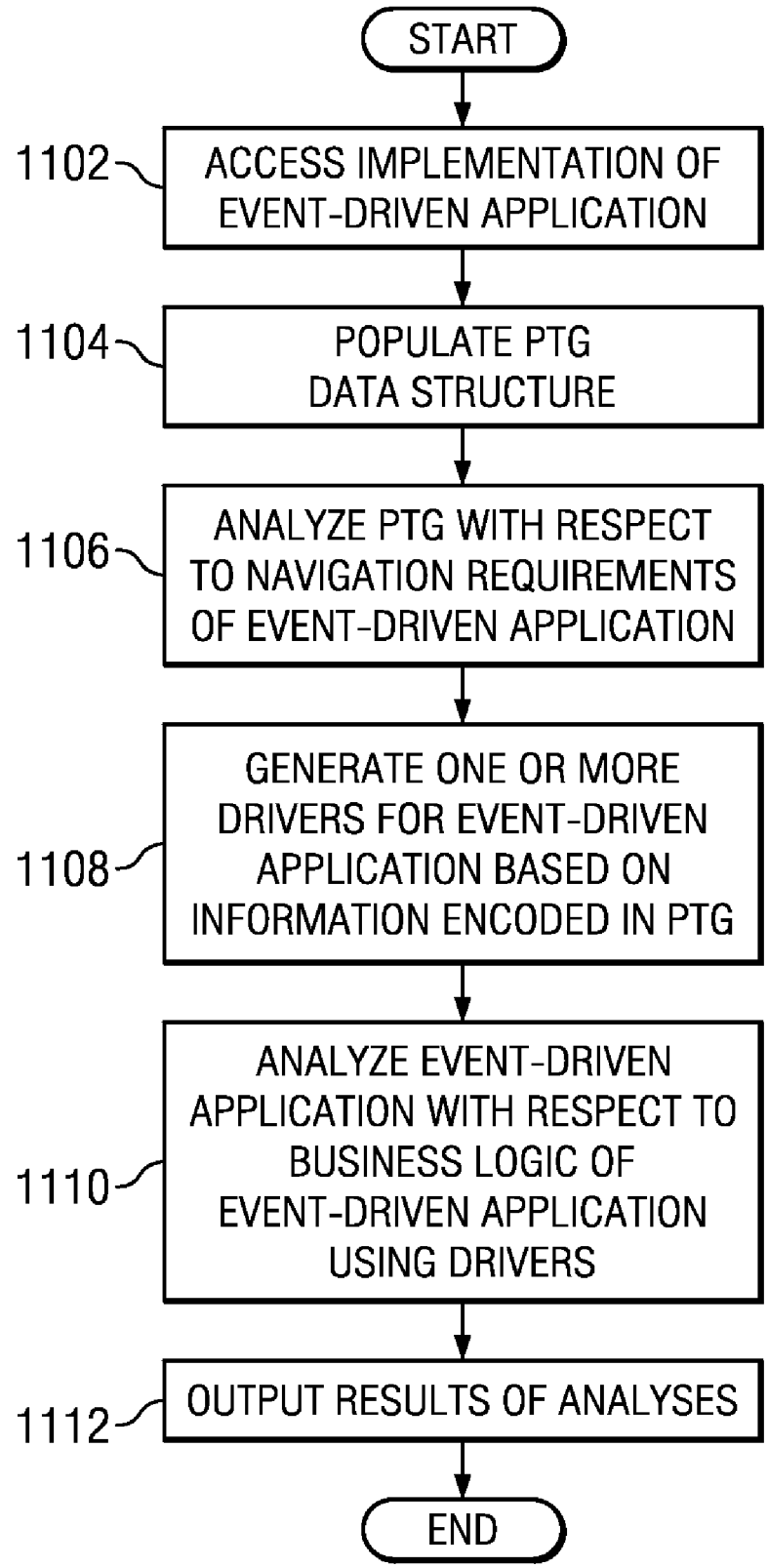
FIG. 9 illustrates an example method for validating an event-driven application.

FIG. 9 illustrates an example method for validating an event-driven application. The method begins at step 1102, where an implementation of the application under test is accessed. At step 1104, a PTG is populated. At step 1106, the PTG is analyzed with respect to navigation requirements (e.g., each page is reachable from the home page) of the application under test. At step 1108, one or more drivers for the application under test are automatically generated based on information encoded in the PTG. At 1110, the drivers are used to analyze the application under test, including validation of business logic requirements of the application under test. At step 1112, one or more results of the analyses are output, at which point the method ends. Although the present disclosure describes and illustrates particular steps of the method of FIG. 9 as occurring in a particular order, the present disclosure contemplates any suitable steps of the method of FIG. 9 occurring in any suitable order. Moreover, although the present disclosure describes and illustrates particular the components carrying out particular steps of the method of FIG. 9, the present disclosure contemplates any suitable combination of any suitable components carrying out any suitable steps of the method of FIG. 9.

FIG. 10 illustrates example output of an example PTG traversal, including test sequences generated and executed by the driver of FIG. 8, based on the PTG of FIG. 6 using the algorithm of FIG. 3 to bound the length of the test sequences.

FIG. 11 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (e.g., another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (e.g., packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (e.g., one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computer systems:
    specifying an application-specific navigation model of an event-driven application, the application-specific navigation model encoding:
        one or more pages of the event-driven application;
        one or more events supported by the event-driven application;
        one or more event handlers for processing one or more of the events; and
        one or more event data for one or more of the events;
    analyzing the navigation model with respect to one or more navigation requirements of the event-driven application to determine whether the event-driven application satisfies the navigation requirements;
    generating one or more drivers for the event-driven application based on the navigation model, wherein the drivers are collectively or individually configured to:
        for each of the pages of the event-driven application, process events that are available and enabled on the page; and
        for each of the events:
            populate the page with event data;
            invoke a registered event handler for the event; and
            calculate a next page based on a result returned by the registered event handler; and
        recursively process the next page; and
    traversing the navigation model with the application-independent event drivers to analyze the event-driven application with respect to one or more business-logic requirements of the event-driven application to determine whether the event-driven application satisfies the business-logic requirements, the traversal comprising:
        for each of one or more first ones of the pages of the event-driven application, determining whether the first one of the pages is reachable from one or more second ones of the pages of the event-driven application, whether the first one of the pages is at least a predetermined number of transitions away from one or more of the seconds ones of the pages, or whether the first one of the pages is reachable without first transitioning to one or more of the seconds ones of the pages; or
        determining whether all the pages of the event-driven application have incoming and outgoing transitions.

2. The method of claim 1, wherein the event-driven application is an open event-driven application.

3. The method of claim 1, wherein the application-specific navigation model is a page transition graph (PTG).

4. The method of claim 1, wherein the event-driven application is a web application comprising one or more of JAVA SERVERPAGES (JSP), Hyper Text Markup Language (HTML) code or content, Extensible Markup Language (XML) code or content, or JAVA code.

5. The method of claim 1, wherein the event-driven application is a STRUTS-based web application.

6. The method of claim 1, wherein the event-driven application is a graphical user interface (GUI) application.

7. The method of claim 1, wherein one or more of the events each comprise one or more page transitions or one or more events that are processed by one or more event handlers.

8. One or more computer-readable non-transitory storage media embodying software that is configured, when executed, to:
    specify an application-specific navigation model of an event-driven application, the application-specific navigation model encoding:
        one or more pages of the event-driven application;
        one or more events supported by the event-driven application;
        one or more event handlers for processing one or more of the events; and
        one or more event data for one or more of the events;
    analyze the navigation model with respect to one or more navigation requirements of the event-driven application to determine whether the event-driven application satisfies the navigation requirements;
    generate one or more drivers for the event-driven application based on the navigation model, wherein the drivers are collectively or individually configured to:

for each of the pages of the event-driven application, process events that are available and enabled on the page; and for each of the events:
- populate the page with event data;
- invoke a registered event handler for the event; and
- calculate a next page based on a result returned by the registered event handler; and recursively process the next page; and traverse the navigation model with the application-independent event drivers to analyze the event-driven application with respect to one or more business-logic requirements of the event-driven application to determine whether the event-driven application satisfies the business-logic requirements, the traversal comprising:

for each of one or more first ones of the pages of the event-driven application, determining whether the first one of the pages is reachable from one or more second ones of the pages of the event-driven application, whether the first one of the pages is at least a predetermined number of transitions away from one or more of the seconds ones of the pages, or whether the first one of the pages is reachable without first transitioning to one or more of the seconds ones of the pages; or determining whether all the pages of the event-driven application have incoming and outgoing transitions.

9. The media of claim 8, wherein the event-driven application is an open event-driven application.

10. The media of claim 8, wherein the application-specific navigation model is a page transition graph (PTG).

11. The media of claim 8, wherein the event-driven application is a web application comprising one or more of JAVA SERVERPAGES (JSP), Hyper Text Markup Language (HTML) code or content, Extensible Markup Language (XML) code or content, or JAVA code.

12. The media of claim 8, wherein the event-driven application is a STRUTS-based web application.

13. The media of claim 8, wherein the event-driven application is a graphical user interface (GUI) application.

14. The media of claim 8, wherein one or more of the events each comprise one or more page transitions or one or more events that are processed by one or more event handlers.

* * * * *